Feb. 1, 1966  E. WILDHABER  3,232,075

GEAR COUPLING

Filed March 11, 1963

INVENTOR:
Ernest Wildhaber

1

3,232,075
GEAR COUPLING
Ernest Wildhaber, Brighton, N.Y.
(124 Summit Drive, Rochester 20, N.Y.)
Filed Mar. 11, 1963, Ser. No. 264,380
5 Claims. (Cl. 64—9)

The present invention relates to gear couplings, also known as flexible shaft couplings. They are used to transmit motion between two shafts or rotary parts whose axes may include an angle with each other, an angle that may vary in operation. A gear coupling comprises an outer member having parallel straight teeth provided internally thereon, and an inner member having crowned teeth projecting outwardly from a body portion and engaging the teeth of said outer member. The outer member of conventional gear couplings has teeth with involute side profiles, and the inner member has generally similar but crowned teeth.

One object of the present invention is to improve the tooth profile of gear couplings and to provide a profile that has less limitations. A further object is to provide a tooth shape for gear couplings that offers manufacturing advantages, and a tooth shape that can be ground in a relatively simple manner on both members. A further aim is to devise a tooth shape that lends itself well also to teeth of coarse pitch, where the present generating processes are at an increased disadvantage.

Other objects will appear in the course of the specification and in the recital of the appended claims.

Figure 1:
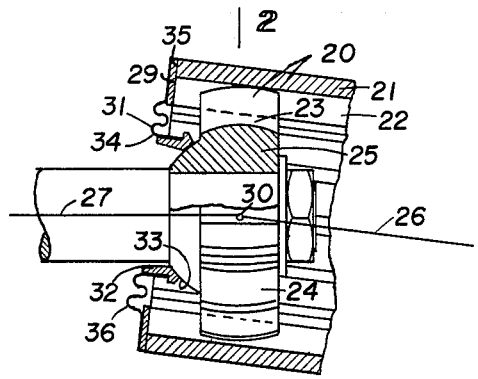
FIG. 1 is an axial section of a gear coupling made according to the present invention, showing the inner member partly in a side view, and with the two members shown at shaft angularity.
Figure 2:
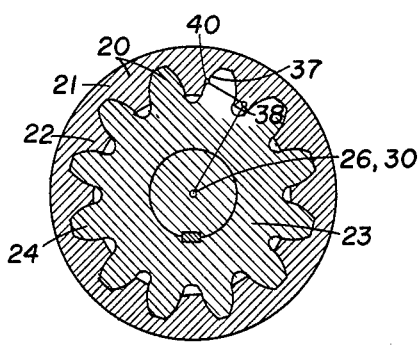
FIG. 2 is a cross-section taken along lines 2—2 of FIG. 1, with the two members in alignment.

The gear coupling 20, FIGS. 1 and 2, comprises an outer member 21 having straight teeth 22 provided internally thereon, and an inner member 23 whose teeth 24 project outwardly from a body portion 25 and are crowned. The two members 21, 23 have equal tooth numbers. The teeth 24 engage the straight teeth 22 and constrain the axes 26 and 27 of the members 21, 23 respectively to intersect at 30.

Gear couplings have backlash varying with the shaft angularity and largest when the shaft axes are aligned. Backlash is small enough not to show up in the small-scale FIG. 2.

Gear couplings are often arranged in pairs, the two couplings of a pair being alike. A seal keeps lubricant in the teeth. The seal 31 of the present invention comprises a ring 32 that engages a spherical portion 33 provided on member 23 and centered at 30. A generally disk-shaped spring 34 is bonded to ring 32 and is secured to the adjacent end 35 of outer member 21, as by screws (not shown). A gasket 29 may be interposed between spring 34 and end 35. The spring permits some displacement of the inner member 23 along axis 26. It has a wavy profile 36, whose waves may be either circular or of spiral form. Other seals may also be used instead.

2

The profiles 37 (FIG. 2) of the teeth 22 are circular arcs centered at 38. Center 38 lies at the projection of the center or axis 26 to the mean profile normal 38–40.

Figure 3:
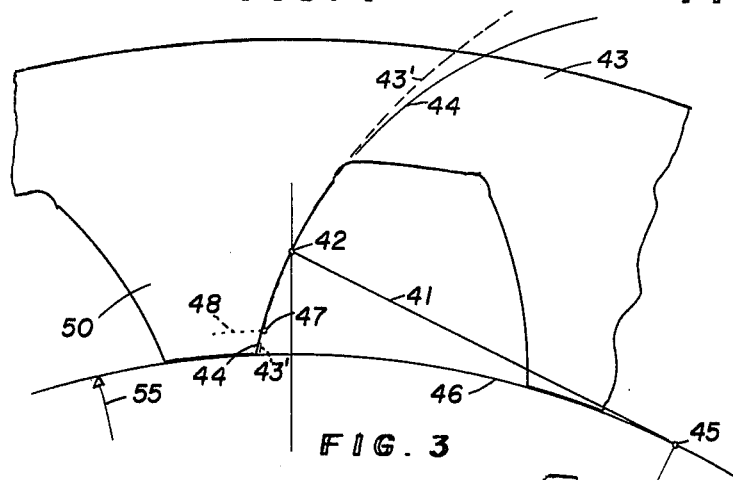
FIG. 3 is a large scale fragmentary view of the outer member of my gear coupling, comparing its profile with an involute profile.

FIG. 3 shows the shape at a larger scale. 41 denotes the normal at mean profile point 42 of outer member 43. The circular arcuate profile 44 has its center at 45, at the projection of the gear center to normal 41. This preferred location represents also the curvature center of an involute tooth profile indicated in dotted lines 43'. The curvature of the involute increases sharply the closer it comes to its base circle 46. At the base circle the curvature radius is zero. Adjacent the base circle the concave profile portion so to say forms a hook that should be kept away from. The used portion of the involute should end at a distance from the base circle, as at point 47. Dotted line 48 then is the inside circle of the outer member.

The circular-arc profile 44 has no such limitation. It may go for instance to circle 46. The higher teeth 50 thus obtained provide a longer duration of contact of the individual teeth and improve the performance.

While I preferably determine the profile radius 42–45 in the way described as the mean curvature radius of an involute, other profile radii may talso be used. such as any radius smaller than the inside radius 55 of the outer member. Also the invention is not confined to exact circular arcs, as long as the minimum profile curvature differs from the maximum profile curvature by less than twenty percent thereof. For instance I may make the profile of the relieved side surface of a milling-cutter tooth an exact circular arc in a section perpendicular to the relieved top surface of the cutting tooth, so that the grinding wheel used thereon can be dressed to an exact circular arc. The profile as cut is then not an exact circular arc.

Figures 4, 5:
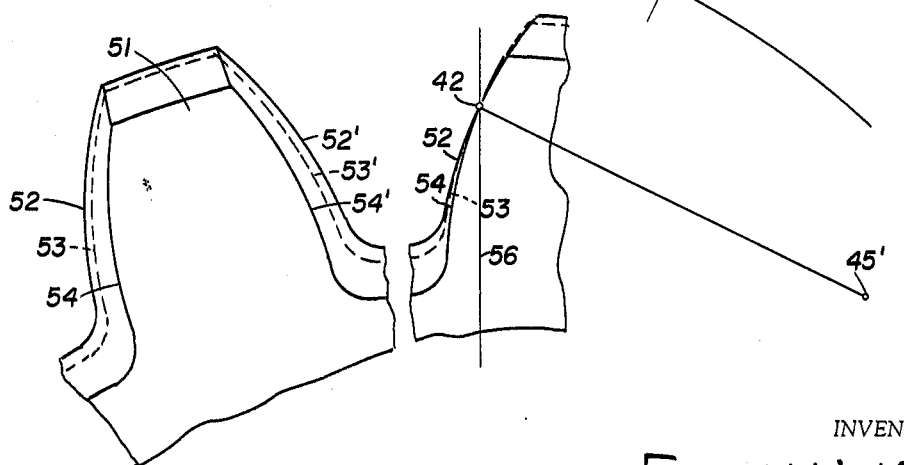
FIG. 4 is an axial view showing a tooth of the crowned inner member of my gear coupling.
FIG. 5 is a similar view and diagram showing the tooth profiles in parallel planes perpendicular to the axis of the crowned inner member superimposed to each other so that they pass through a common mean point.

FIG. 4 shows the tooth profiles of the external teeth 51 of the crowned coupling member. 52, 52' are the profiles of the mid-section, such as section 2—2 of FIG. 1. 54, 54' are the profiles at the tooth ends, in a plane perpendicular to the axis of the member and parallel to the mid-plane. The dotted lines 53, 53' are the profiles in a plane parallel to said two planes and midway between them.

The profiles 52, 53, 54 and profiles 52', 53', 54' symmetrical thereto have varying inclinations to the radial direction, at the same radial distance. This is best shown in FIG. 5, where the profiles 52, 53, 54 are turned about the axis of the crowned member so that they all pass through mean point 42.

The profile inclination to the radial direction 56 is largest on profile 52 of the mid-section. It is smaller on profile 53 and still smaller on profile 54 at the end of the teeth. The profile inclination decreases from the center towards both ends of the teeth. This change is approximately the same as with the involute profiles on the outer member, described at length in my Patent No. 2,922,294, granted Jan. 26, 1960, when the profile radii are determined as described. Reference is made to this patent.

The profiles 52, 53, 54 are approximately circular arcs, where the minimum curvature differs from the maximum curvature by less than twenty percent thereof. On couplings intended to run at zero and other shaft angularities the convex profile 52 of the mid-plane is identical with the concave profile 44 of the internally toothed outer member, when full profile bearing is aimed at. The profile inclination is the same and the radii 42–45 and 42–45' are equal. The convex profiles may however also be eased off at their ends if desired, that is made slightly more curved, to render them less sensitive to manufacturing tolerances.

While the invention has been described in connection with several different embodiments thereof, it will be understood that it is capable of further modifications, and uses, and this application is intended to cover any variations, uses, or adaptations of the invention following, in general, the principles of the invention and including such departures from the present disclosure as come within known or customary practice in the art to which the invention pertains, and as may be applied to the essential features herein set forth, and as fall within the scope of the invention or the limits of the appended claims.

I claim:

1. A gear coupling comprising an outer member having parallel straight teeth provided internally thereon and an inner member having crowned teeth projecting outwardly from a body portion and engaging the teeth of said outer member, said members having equal tooth numbers, said outer member having concave and approximately circular arcuate tooth profiles in planes perpendicular to its axis, the radius of said profiles being approximately constant, the crowned teeth of said inner member having also tooth profiles of approximately constant curvature.

2. A gear coupling comprising an outer member having parallel straight teeth provided internally thereon, and an inner member having crowned teeth projecting outwardly from a body portion and engaging the teeth of said outer member, said members having equal tooth numbers, said outer member having concavely curved tooth profiles in planes perpendicular to its axis, the curvature being approximately constant along the length of said profiles so that the minimum curvature differs from the maximum curvature by less than twenty percent, the crowned teeth of said inner member having also tooth profiles of approximately constant curvature, and the curvature center at a mean profile point of the outer gear member being at the projection of the gear center to the profile normal at said point.

3. A gear coupling comprising an outer member having parallel straight teeth provided internally thereon and an inner member having crowned teeth projecting outwardly from a body portion and engaging the teeth of said outer member, said members having equal tooth numbers, said outer member having concave circular arcuate tooth profiles whose radius is smaller than the inside radius of said outer member, said inner member having cross-sectional tooth profiles of approximately constant curvature.

4. A gear coupling comprising an outer member having parallel straight teeth provided internally thereon and an inner member having crowned teeth projecting outwardly from a body portion and engaging the teeth of said outer member, said members having equal tooth numbers, said outer member having concave circular arcuate tooth profiles whose radius is smaller than the inside radius of said outer member, said inner member having teeth of varying profile inclination in parallel planes perpendicular to its axis at the same radial distance, the inclination of said profiles to the radial direction decreasing from the center towards both ends of the teeth.

5. A gear coupling according to claim 2, wherein said crowned inner member has tooth profiles in parallel planes perpendicular to its axis whose inclination to the radial direction changes lengthwise of the teeth and decreases towards both tooth ends in a manner that the tooth surface normals at a mean radius have an approximately constant inclination to the peripheral direction.

References Cited by the Examiner

UNITED STATES PATENTS

| | | | |
|---|---|---|---|
| 2,508,556 | 5/1950 | Wildhaber | 90—5 |
| 2,766,664 | 10/1956 | Ciallie | 90—5 |
| 2,841,966 | 7/1958 | Belden et al. | 64—9 |
| 2,859,508 | 11/1958 | Shannon | 29—103 |
| 2,916,803 | 12/1959 | Wildhaber | 29—103 |
| 2,922,294 | 1/1960 | Wildhaber | 64—9 |

BROUGHTON G. DURHAM, *Primary Examiner.*

ROBERT C. RIORDON, MILTON KAUFMAN,
*Examiners.*